United States Patent [19]
Fukuzumi

[11] Patent Number: 6,079,019
[45] Date of Patent: Jun. 20, 2000

[54] IC MEMORY CARD

[75] Inventor: Tomoya Fukuzumi, Tokyo, Japan

[73] Assignee: Mitsubishi Denki Kabushiki Kaisha, Tokyo, Japan

[21] Appl. No.: 08/820,760

[22] Filed: Mar. 19, 1997

[30] Foreign Application Priority Data

Oct. 22, 1996 [JP] Japan .................................. 8-279201

[51] Int. Cl.⁷ .................................................. G06F 12/14
[52] U.S. Cl. ........................ 713/193; 713/183; 713/202; 711/164
[58] Field of Search ............................. 380/3, 4, 25, 23; 711/163, 164; 713/200, 201, 202, 183, 190, 193, 165, 166, 167

[56] References Cited

U.S. PATENT DOCUMENTS

| | | | |
|---|---|---|---|
| 4,960,982 | 10/1990 | Takahira | 235/382 |
| 5,293,424 | 3/1994 | Holtey et al. | 380/23 |
| 5,379,344 | 1/1995 | Larsson et al. | 380/251 |
| 5,428,684 | 6/1995 | Akiyama et al. | 380/281 |
| 5,539,825 | 7/1996 | Akiyama et al. | 705/68 |
| 5,590,193 | 12/1996 | Le Roux | 380/4 |
| 5,615,262 | 3/1997 | Guy et al. | 380/4 |
| 5,623,637 | 4/1997 | Jones et al. | 711/164 |
| 5,825,878 | 10/1998 | Takahashi et al. | 380/4 |
| 5,875,480 | 2/1999 | Le Roux et al. | 380/4 X |

FOREIGN PATENT DOCUMENTS

| | | |
|---|---|---|
| 63-211049 | 9/1988 | Japan . |
| 2-235158 | 9/1990 | Japan . |
| 4-205397 | 7/1992 | Japan . |
| 4-232588 | 8/1992 | Japan . |
| 7-50663 | 2/1995 | Japan . |

*Primary Examiner*—Pinchus M. Laufer

[57] ABSTRACT

An IC memory card having an interface circuit complying with PC card standard and a memory comprises a password check circuit for comparing a password input from an external computer with a predetermined password and one or both of a data decipherment circuit for deciphering enciphered data stored in the memory if the passwords coincide with each other and a data encipherment circuit for enciphering data input from the external computer if the passwords coincide with each other.

15 Claims, 10 Drawing Sheets

IC MEMORY CARD

BACKGROUND OF THE INVENTION

1. Field of the Invention

The present invention relates to IC memory cards that comply with PC card standards and are used for external storage media for information processing equipment such as notebook personal computers, portable terminal units, and the like.

2. Description of the Related Art

FIG. 10 is a block diagram illustrating an example of prior IC memory cards. In FIG. 10, an IC memory card 100 comprises a memory section 103 that stores data from a host system apparatus 101 and an interface section 102 that complies with PC card standards and interfaces with host system apparatus 101. Host system apparatus 101 consists in an information processing apparatus. Interface section 102 comprises an address bus buffer 104, an address decoder 105, a card mode controller 106, and a data bus buffer 107. Address bus buffer 104 and address decoder 105 are connected to host system apparatus 101 through an address bus 108. Card mode controller 106 is connected to host system apparatus 101 through a control bus 109. Data bus buffer 107 is connected to host system apparatus 101 through a data bus 110.

Further, address bus buffer 104 is connected to memory section 103 through an internal address bus 111. Card mode controller 106 is connected to memory section 103 through a plurality of signal lines 112. Data bus buffer 107 is connected to memory section 103 through an internal data bus 113. Address decoder 105 is connected to card mode controller 106, which is connected to data bus buffer 107.

In this construction, address bus buffer 104 receives address data from host system apparatus 101 through address bus 108 and outputs the input address data into memory section 103 through internal address bus 111. Further, address decoder 105 also receives the address data from host system apparatus 101 through address bus 108 and decodes the address data to output the decoded address data into card mode controller 106.

In addition to the decoded address data from address decoder 105, card mode controller 106 is also provided with a card-mode control signal comprising an output-enable signal, a write-enable signal, and a card-enable signal by host system apparatus 101 through control bus 109. Card mode controller 106 then generates from these signals a memory control signal, which consists of an output-enable signal, a write-enable signal, a chip select signal, and the like, for controlling memory section 103, and also generates an I/O control signal. Card mode controller 106 then outputs the memory control signal into memory section 103 through signal lines 112 and outputs the I/O control signal into data bus buffer 107.

Data bus buffer 107 performs I/O control, in data bus 110 and internal data bus 113, of data between host system apparatus 101 and memory section 103 based on the I/O control signal input from card mode controller 106. Further, memory section 103 performs the writing and reading of data through internal data bus 113 based on the address data input through internal address bus 111 and the memory control signal input through signal lines 112.

In a system having IC memory cards as its external storage media, data stored in an IC memory card is usually enciphered for security protection. In this case, for the above IC memory card 100, host system apparatus 101 has to encipher and decipher the data, so that the load of host system apparatus 101 becomes great. Further, host system apparatus 101 requires a large-scale system construction to use up great amounts of cost, labor, and time.

SUMMARY OF THE INVENTION

The present invention has been therefore devised to solve the above problems. Namely, an essential object of the present invention is to provide IC memory cards that can encipher and decipher data.

According to a first facet of the present invention, in an IC memory card having an interface section complying with PC card standards and a memory section that stores data including enciphered data through the interface section when connected to an external host system apparatus as an information processing apparatus, the IC memory card further includes a password check circuit that compares a password input from the host system apparatus with a predetermined password to output the password comparison result and a data decipherment circuit that deciphers the data read out from the memory section based on the password comparison result. The data decipherment circuit deciphers the data read out from the memory section to output the deciphered data into the host system apparatus through the interface section, if the passwords coincide with each other. The data decipherment circuit outputs the data read out from the memory section, without decipherment, into the host system apparatus through the interface section, if the passwords do not coincide with each other.

According to a second facet of the present invention, in an IC memory card having an interface section complying with PC card standards and a memory section that stores data through the interface section when connected to an external host system apparatus as an information processing apparatus, the IC memory card further includes a password check circuit that compares a password input from the host system apparatus with a predetermined password to output the password comparison result and a data encipherment circuit that enciphers the data input from the host system apparatus based on the password comparison result. The data encipherment circuit enciphers the data input from the host system apparatus through the interface section to store the enciphered data in the memory section, if the passwords coincide with each other. The data encipherment circuit stores the data input from the host system apparatus through the interface section in the memory section without encipherment, if the passwords do not coincide with each other.

According to a third facet of the present invention, in an IC memory card of the above second facet of the present invention, the IC memory card further includes a data decipherment circuit that deciphers the data read out from the memory section based on the password comparison result. The data decipherment circuit deciphers the data read out from the memory section to output the deciphered data into the host system apparatus through the interface section, if the passwords coincide with each other. The data decipherment circuit outputs the data read out from the memory section, without decipherment, into the host system apparatus through the interface section, if the passwords do not coincide with each other.

According to a fourth facet of the present invention, in an IC memory card of the above first to third facets of the present invention, the password check circuit includes a check-data register section consisting of a plurality of registers, each of which latches a data piece of a password input from the host system apparatus, a register controller that controls the latching operation of the check-data register section, a comparison-data setting section in which predetermined password data for comparison is set beforehand, and a data comparison section that compares the password data latched in the check-data register section with the password data for comparison set in the comparison-data setting section to output the comparison result, which becomes the password comparison result.

According to a fifth facet of the present invention, in an IC memory card of the fourth facet of the present invention, each piece of data forming the predetermined password for comparison is set in the comparison-data setting section, corresponding to each data piece that has been latched in each register of the check-data register section.

According to a sixth facet of the present invention, in an IC memory card of the fourth and fifth facets of the present invention, the register controller generates a control signal from the address data and a card-mode control signal, which are input from the host system apparatus, and outputs the control signal into the check-data register section, which is controlled by the control signal.

According to a seventh facet of the present invention, in an IC memory card of the fourth to sixth facets of the present invention, the check-data register section forms a standard I/O space for access, using an I/O function complying with PC card standards.

According to an eighth facet of the present invention, in an IC memory card of the first to third facets of the present invention, the password check circuit includes a check-data register section consisting of a plurality of registers, each of which latches a data piece of a password input from the host system apparatus, a check-data storage section consisting in rewritable ROM in which password data for comparison is stored, a comparison-data register section consisting of a plurality of registers, each of which latches a data piece of a password for comparison stored in the comparison-data storage section, a control section that controls the operation of the comparison-data storage section as well as the latching operation of the check-data register section and comparison-data register section, and a data comparison section that compares the password data latched in the check-data register section with the password data for comparison latched in the comparison-data register section to output the comparison result, which becomes the password comparison result.

According to a ninth facet of the present invention, in an IC memory card of the eighth facet of the present invention, the comparison-data register section latches in its each register each piece of data forming the predetermined password for comparison and stored in the comparison-data storage section, corresponding to each data piece that has been latched in each register of the check-data register section.

According to a tenth facet of the present invention, in an IC memory card of the eighth and ninth facets of the present invention, the check-data register section, comparison-data storage section, and comparison-data register section form a standard I/O space for access, using an I/O function complying with PC card standards and share with each other the addresses of the standard I/O space.

According to an eleventh facet of the present invention, in an IC memory card of the eighth to tenth facets of the present invention, the control section comprises a signal generator that generates control signals from the address data and a card-mode control signal that are input from the host system apparatus, each of the control signals being output into each of the check-data register section, the comparison-data register section, and the comparison-data storage section, which are controlled thereby respectively and a data-rewrite judgment section that decides whether to allow the rewriting of the password data for comparison by checking password data for data rewrite input from the host system apparatus. The signal generator outputs a control signal for rewrite operation to the comparison-data storage section, only when the data-rewrite judgment section decides to allow the rewriting of the password data for comparison.

According to a twelfth facet of the present invention, in an IC memory card of the eleventh facet of the present invention, the data-rewrite judgment section has a register that forms a standard I/O space for access, using an I/O function complying with PC card standards, and latches the password data for data rewrite in the registers. The data-rewrite judgement section then compares the latched password data for data rewrite with preset data for comparison to decide to allow the rewriting of the password data for comparison, only when the compared data coincide.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following description taken in conjunction with the preferred embodiments thereof and the accompanying drawings throughout which like parts are designated by like reference numerals, and in which.

DETAILED DESCRIPTION OF THE PREFERRED EMBODIMENTS

The preferred embodiments according to the present invention will be described below in conjunction with the attached drawings.

First Embodiment.

Figure 1:
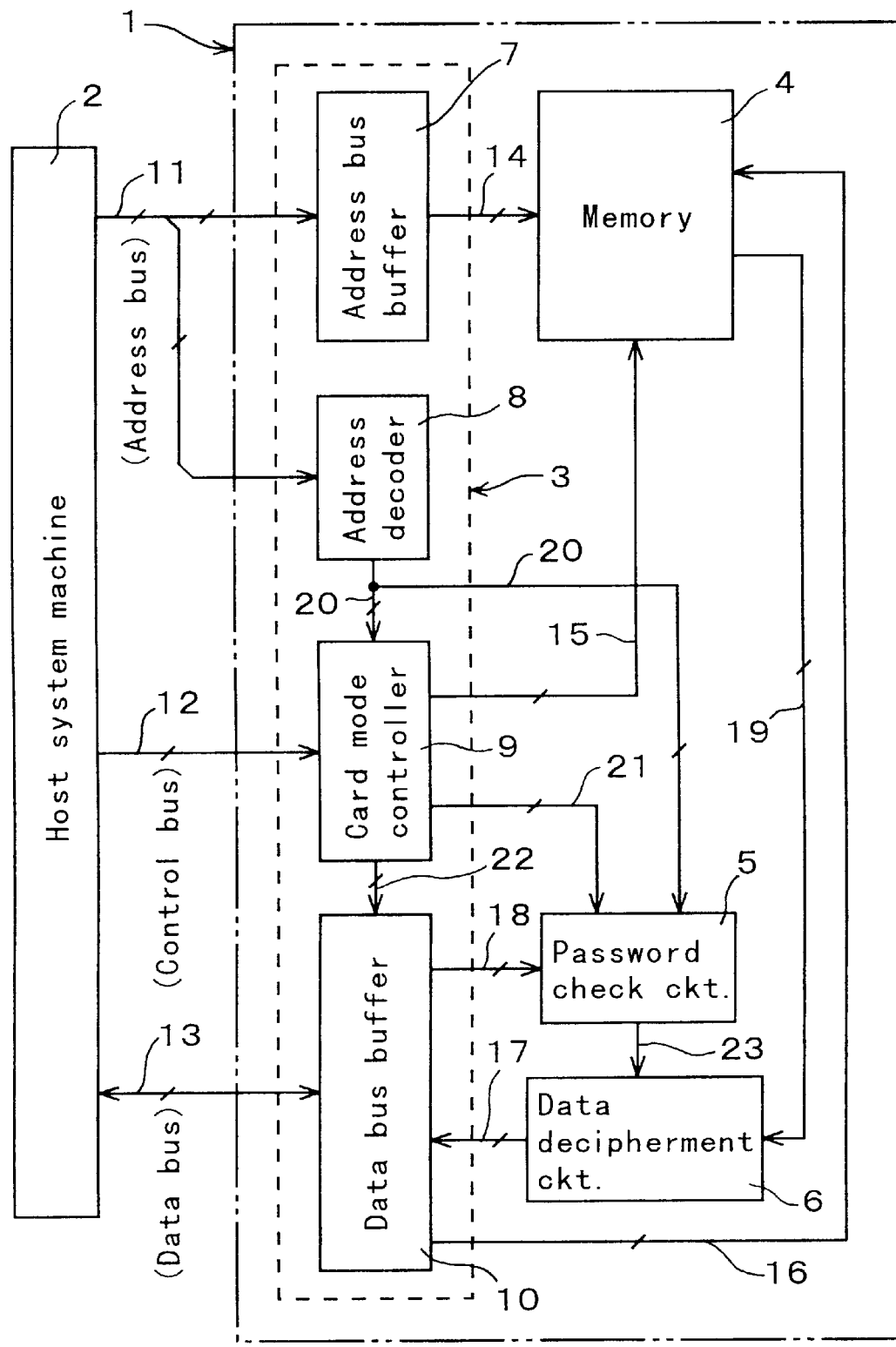
FIG. 1 is a block diagram illustrating an example of IC memory card according to a first embodiment of the present invention.

FIG. 1 is a block diagram illustrating an example of IC memory cards in a first embodiment of the present invention. In FIG. 1, an IC memory card 1 comprises an interface section 3 that complies with PC card standards and interfaces with a host system apparatus 2 consisting in an information processing apparatus, a memory section 4 that stores data from host system apparatus 2, a password check circuit 5 that checks passwords, and a data decipherment section 6 that deciphers data.

Interface section 3 includes an address bus buffer 7, an address decoder 8, a card mode controller 9, and a data bus buffer 10. Address bus buffer 7 and address decoder 8 are connected to host system apparatus 2 through an address bus 11. Card mode controller 9 is connected to host system apparatus 2 through a control bus 12. Data bus buffer 10 is connected to host system apparatus 2 through a data bus 13. Further, address bus buffer 7 is connected to memory section 4 through an internal address bus 14. Card mode controller 9 is connected to memory section 4 through a plurality of signal lines 15.

Further, data bus buffer 10 is connected to memory section 4 through an internal data bus 16, to data decipherment circuit 6 through an internal data bus 17, and to password check circuit 5 through an internal data bus 18. Data decipherment circuit 6 is connected to memory section 4 through an internal data bus 19. Address decoder 8 is connected in parallel to card mode controller 9 through a plurality of signal lines 20. Card mode controller 9 is connected to password check circuit 5 through a plurality of signal lines 21 and to data bus buffer 10 through a plurality of signal lines 22. Password check circuit 5 is connected to data decipherment circuit 6 through a signal line 23.

In this construction, address bus buffer 7 receives address data from host system apparatus 2 through address bus 11 and outputs the input address data into memory section 4 through internal address bus 14. Further, address decoder 8 also receives the address data from host system apparatus 2 and decodes the address data into a decoded address signal to output the decoded address signal into password check circuit 5 and card mode controller 9 through signal lines 20.

In addition to the decoded address signal from address decoder 8, card mode controller 9 is also provided by host system apparatus 2 with a card-mode control signal comprising an output-enable signal, a write-enable signal, and a card-enable signal through control bus 12. Card mode controller 9 then generates from the card-mode control signal a memory control signal, which consists of an output-enable signal, a write-enable signal, a chip select signal, and the like, for controlling memory section 4, and also generates an I/O control signal and a password-check control signal, which is used for control of the password checking in password check circuit 5. Card mode controller 9 outputs the generated memory control signal into memory section 4 through signal lines 15, outputs the I/O control signal into data bus buffer 10 through signal lines 22, and outputs the password-check control signal into password check circuit through signal lines 21.

Data bus buffer 10 performs I/O control, in data bus 13 and internal data buses 16 to 18, based on the I/O control signal input from card mode controller 9. Further, data input from host system apparatus 2 is written in memory section 4 through internal data bus 16 based on the address data input through internal address bus 14 and the memory control signal. Here, the data written in memory section 4 through internal data bus 16 is enciphered beforehand in host system apparatus 2. However, non-enciphered data may also be written in memory section 4.

Next, the case in which data stored in memory section 4 is read out into host system apparatus 2 is described in the following. When password check circuit 5 performs password checking based on the password-check control signal input from card mode controller 9 and the decoded address signal input from address decoder 8, password check circuit 5 checks a password input from host system apparatus 2 through data bus 13, data bus buffer 10, and internal data bus 18. Further, password check circuit 5 outputs an enable signal into data decipherment circuit 6 through signal line 23, so that data decipherment circuit 6 is enabled. Then data decipherment circuit 6 deciphers data input from memory section 4 through internal data bus 19.

Then, the data deciphered by data decipherment circuit 6 is output into data bus buffer 10 through internal bus 17, and therefrom output to host system apparatus 2 through data bus 13. If data decipherment circuit 6 does not receive an enable signal, then data decipherment circuit 6 outputs data input from memory section 4 through internal data bus 19 to host system apparatus 2, without decipherment, through data bus 13. It is assumed in the following that a password input from host system apparatus 2 is formed of an 8-bit data word.

Figure 2:
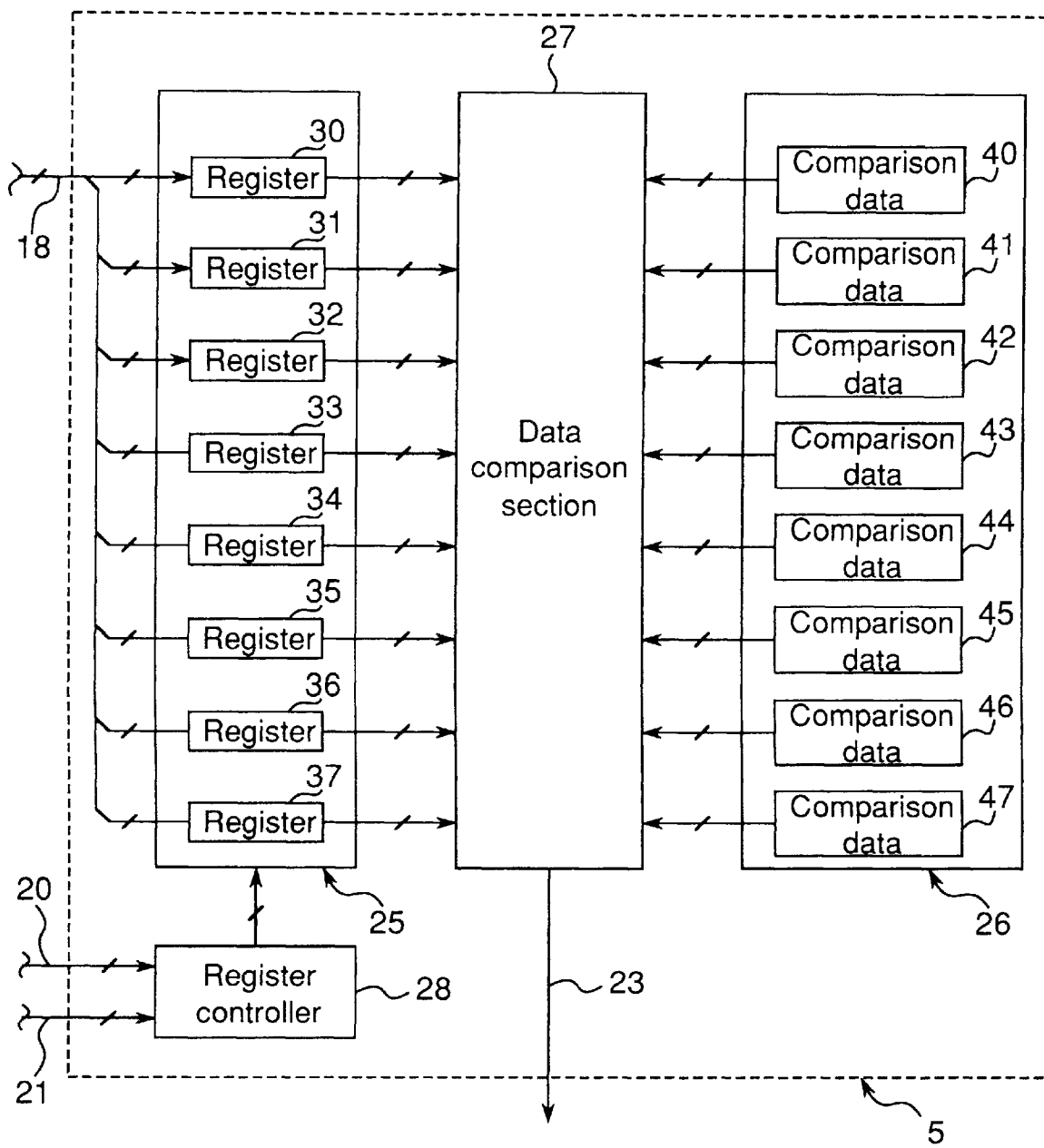
FIG. 2 is a block diagram illustrating an example of the password check circuit 5 shown in FIG. 1.

FIG. 2 is a block diagram illustrating an example of the password check circuit 5. In FIG. 2, password check circuit 5 includes a check-data register section 25 consisting of a plurality of registers, each of which latches a data piece of a password input from internal data bus 18, a comparison-data setting section 26 that sets password data for comparison to be used for judging whether an input password is correct or not, and a data comparison section 27 consisting in a comparator that compares the password data latched in check-data register section 25 with the password data for comparison set in comparison-data setting section 26, and a register controller 28 that controls each register of check-data register section 25.

Check-data register section 25 is composed of eight 8-bit registers 30 to 37 that can latch 8-byte data. Further, corresponding to registers 30 to 37, comparison-data setting section 26 is composed of eight 8-bit comparison data words 40 to 47 that form a password for comparison. Each of registers 30 to 37 of check-data register section 25 is connected in parallel to internal data bus 18 and also connected to data comparison section 27. Data comparison-data setting section 26 is connected to data comparison section 27 so that each comparison data word 40 to 47 is input thereto in parallel. Further, data comparison section 27 is connected to data decipherment circuit 6 through signal line 23.

Check-data register section 25 forms a standard I/O space for access, using an I/O function complying with PC card standards. For example, register 30 has 1F0h as its I/O address; register 31 has 1F1h; register 32 has 1F2h; register 33 has 1F3h; register 34 has 1F4h; register 35 has 1F5h; register 36 has 1F6h; and register 37 has 1F7h. Each comparison data word 40 to 47 is formed by hardware. The setting of data in the hardware is performed, for example, by using pull-up registers, pull-down registers, and the like.

When host system apparatus 2 gains write access to registers 30 to 37, that is, to the standard I/o space, card mode controller 9 outputs a password-check control signal into register controller 28 to enable check-data register section 25. Register controller 28 outputs into check-data register section 25 a select signal that selects the register of the address indicated by the decoded address signal input from address decoder 8. At this time, data input through internal data bus 18 is latched in the register selected by the select signal.

For example, if the address indicated by the decoded address signal input from address decoder 8 indicates the register 30, then register controller 28 outputs a select signal into register 30. Register 30 then latches data input through internal data bus 18. Similarly, the data is latched in registers 31 to 37, so that the password data input from host system apparatus 2 is latched in registers 30 to 37.

Data comparison section 27 compares the data latched in register 30 with comparison data word 40, data latched in register 31 with comparison data word 41, data latched in register 32 with comparison data word 42, data latched in register 33 with comparison data word 43, data latched in register 34 with comparison data word 44, data latched in register 35 with comparison data word 45, data latched in register 36 with comparison data word 46, and data latched in register 37 with comparison data word 47. As a result of the comparison, data comparison section 27 outputs an enable signal into data decipherment circuit 6 through signal line 23, if the data latched in check-data register section 25 coincides with the data words for comparison set in comparison-data setting section 26. Data comparison section 27 terminates the output of an enable signal, if they do not coincide. Data decipherment circuit 6 performs decipherment of data input from memory section 4 through internal data bus 19, only if it receives an enable signal from data comparison section 27 to output the deciphered data to host system apparatus 2 through internal data bus 17, data bus buffer 10, and data bus 13.

Data decipherment circuit 6 outputs the data input from memory section 4 without decipherment to host system apparatus 2 through internal data bus 17, data bus buffer 10, and data bus 13, if it does not receive an enable signal. Here, the encipherment and decipherment of data are performed by publicly known methods such as with Reed-Solomon codes or the like, so that their descriptions are omitted. Data comparison section 27 always performs the comparison of the data in registers 30 to 37 of check-data register section 25 with the data for comparison in comparison-data setting section 26.

Figure 3:
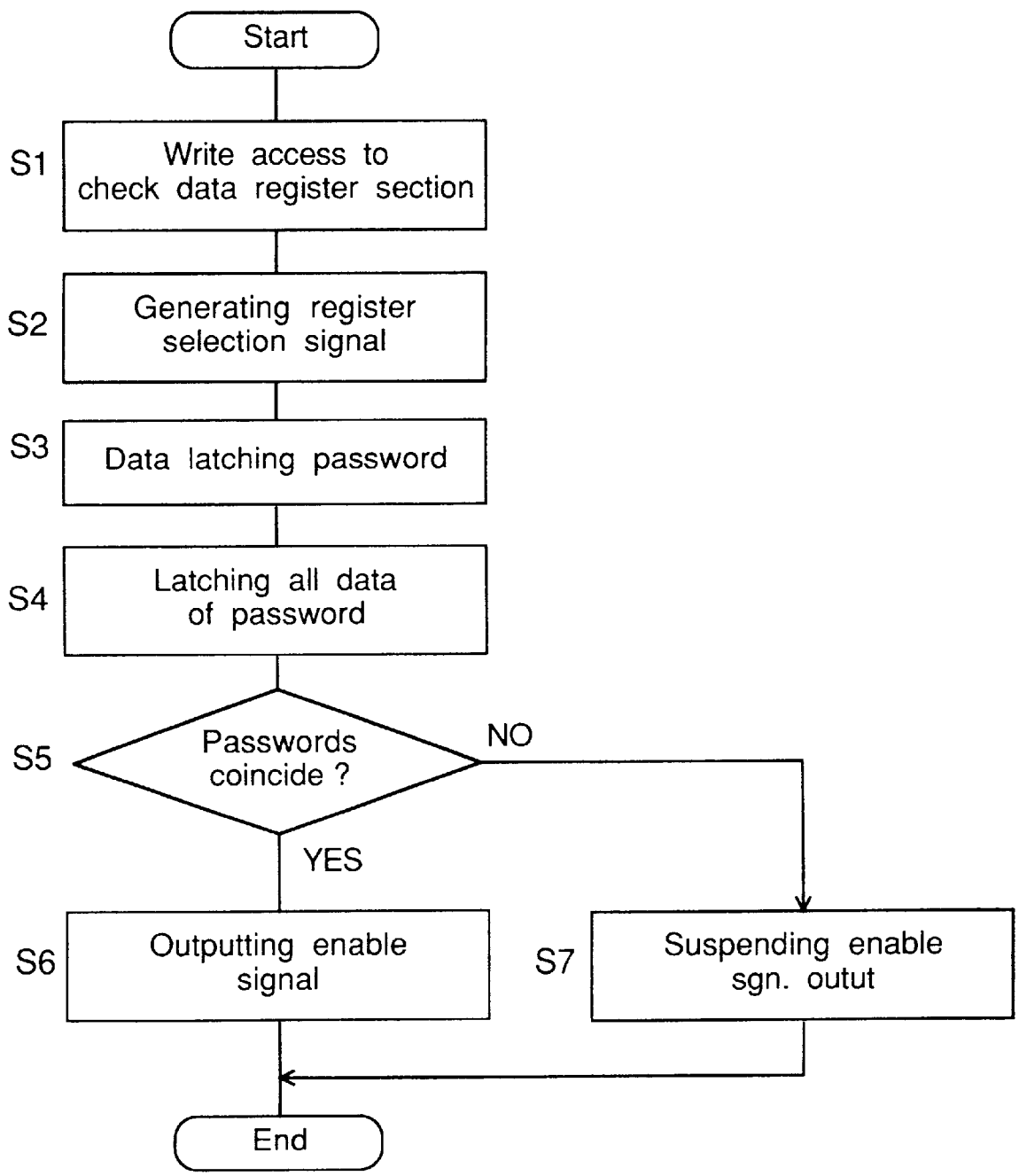
FIG. 3 is a flowchart showing an example of checking operation in the password check circuit 5 illustrated in FIG. 2.

FIG. 3 is a flowchart showing an example of the checking operation in password check circuit 5 illustrated in FIG. 2. In FIG. 3, first in step S1, host system apparatus 2 gains write access to the addresses of registers 30 to 37. Password check circuit 5 receives the password-check control signal from card mode controller 9 to enable check-data register section 25 and also receives the decoded address signal from address decoder 8. In step S2, register controller 28 generates a select signal for selecting the register of the address in check-data register section 25 indicated by the decoded address signal. In step S3, register controller 28 outputs the generated select signal into registers in check-data register section 25, and the register selected by the select signal latches the data input through internal data bus 18.

Next, in step S4, the procedure of steps S1 to S3 is repeated so that all the registers 30 to 37 of check-data register section 25 latch their corresponding data words of the password input from host system apparatus 2 through internal data bus 18. In step S5, data comparison section 27 compares each password data word latched in the registers 30 to 37 of check-data register section 25 with each of the data words 40 to 47 for comparison set in comparison-data setting section 26 to test whether the compared data coincide. If they coincide (YES), then the flow proceeds with step S6.

In step S6, data comparison section 27 outputs an enable signal into data decipherment circuit 6, so that data decipherment circuit 6 deciphers the data input from memory section 4, and the flow is terminated. If the compared data do not coincide in S5 (NO), then in step S7, data comparison section 27 terminates the output of an enable signal for data decipherment circuit 6, so that data decipherment circuit 6 does not decipher the data input from memory section 4, and the flow is terminated.

In this way, an IC memory card of the present first embodiment can internally perform data decipherment. Further, the present embodiment uses an I/O function complying with PC card standards to check a password input from host system apparatus 2. The IC memory card deciphers data read out from memory section 4 to output the deciphered data to host system apparatus 2, only if the password data input from host system apparatus 2 coincides with predetermined password data set beforehand. If the password data do not coincide, then the IC memory card does not decipher the data read out from memory section 4 and directly outputs to host system apparatus 2.

According to the present embodiment, enciphered data stored in the IC memory card can be deciphered by only a system apparatus or operators knowing a predetermined password, so that the security of data can be protected. Further, the IC memory card can be used as an ordinary PC card complying with PC card standards by storing non-enciphered data in the IC memory card, so that the universality of the IC memory card is great. Further, the operation of checking the password is performed comparably easily and effectively using the I/O function complying with PC card standards. Finally, the host system apparatus does not need to decipher enciphered data, so that its load can be reduced.

Second Embodiment.

An IC memory card of the above first embodiment is equipped with the data decipherment circuit 6 that performs data decipherment. However, an IC memory card may be designed to be equipped with a data encipherment circuit in place of data decipherment circuit 6. An IC card of a second embodiment of the present invention is constructed in this way.

Figure 4:
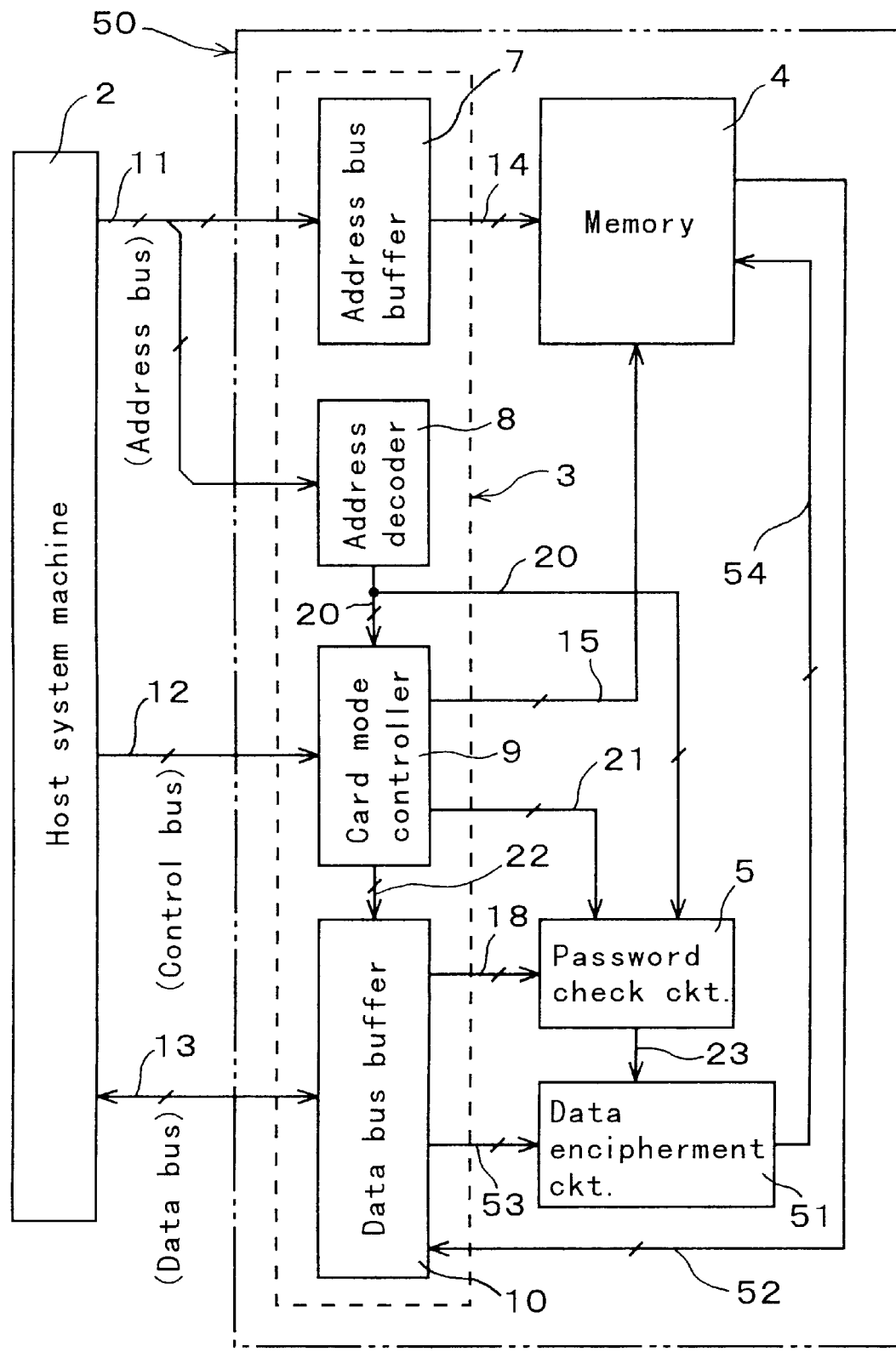
FIG. 4 is a block diagram illustrating an example of IC memory card according to a second embodiment of the present invention.

FIG. 4 is a block diagram illustrating an example of IC memory cards in the second embodiment of the present invention. In FIG. 4, the same components as in FIG. 1 are denoted by the same numerals, and their descriptions are omitted here.

The IC card of FIG. 4 differs from that of FIG. 1 as follows. The data decipherment circuit 6 of FIG. 1 has been replaced with a data encipherment circuit 51. The internal data bus 16 has been replaced with an internal data bus 52. The internal data bus 17 of FIG. 1 has been replaced with an internal data bus 53. The internal data bus 19 of FIG. 1 has been replaced with an internal data bus 54. The IC memory card 1 has been changed into an IC memory card 50 with these changes. Consequently, in FIG. 4, IC memory card 50 comprises an interface section 3, a memory section 4, a password check circuit 5, and a data encipherment circuit 51 that enciphers data.

Data bus buffer 10 of interface section 3 is connected to memory section 4 through an internal data bus 52, and to data encipherment circuit 51 through an internal data bus 53. Data encipherment circuit 51 is connected to memory section 4 through an internal data bus 54. Password check circuit 5 is connected to data encipherment circuit 51 through a signal line 23.

Data bus buffer 10 performs I/O control, in data bus 13 and internal data buses 18, 52, and 53, based on an I/O control signal input from card mode controller 9. Further, data is read out from memory section 4 into host system apparatus 2 through internal data bus 52, based on the address data input through internal address bus 14 and a memory control signal input through signal lines 15. Here, the data read out from memory section 4 through internal data bus 52 is deciphered in host system apparatus 2. However, non-enciphered data can also be read out from memory section 4.

Next, the case in which data from host system apparatus 2 is written in memory 4 is described in the following. When password check circuit 5 performs password checking based on the password-check control signal input from card mode controller 9 and the decoded address signal input from address decoder 8, password check circuit 5 checks a password input from host system apparatus 2 through data bus 13, data bus buffer 10, and internal data bus 18. Further, password check circuit 5 outputs an enable signal into data encipherment circuit 51 through signal line 23, so that data decipherment circuit 6 is enabled. Then data encipherment circuit 51 enciphers data input from host system apparatus 2 through data bus 13, data bus buffer 10, and internal data bus 53.

Then, the data enciphered by data encipherment circuit 51 is output into memory section 4 through internal data bus 54 to be written in memory section 4. If data encipherment circuit 51 does not receive an enable signal, data encipherment circuit 51 outputs data input from host system apparatus 2 through data bus, data bus buffer 10, and internal data bus 53 into memory section 4, without encipherment, so that the non-enciphered data is written in memory section 4. The operation of checking the password in password check circuit 5 is the same as in the first embodiment, so that its description is omitted here. Further, the decipherment and encipherment of data are performed by publicly known methods such as with Reed-Solomon codes and the like, so that their descriptions are omitted here.

According to the present second embodiment, data is enciphered and stored in the IC memory card by only a system apparatus or operators knowing a predetermined password, so that the security of data can be protected. Further, data can be stored in the IC memory card without encipherment, so that the IC memory card can be used as an ordinary PC card complying with PC card standards, and the universality of the IC memory card is great. Further, Further, the operation of checking the password is performed comparably easily and effectively using the I/O function complying with PC card standards. Finally, data does not need to be enciphered in the host system apparatus, so that the load of the host system apparatus can be reduced.

Third Embodiment.

An IC memory card may be designed to be equipped with both a data decipherment circuit 6 of the first embodiment and a data encipherment circuit 51 of the second embodiment. An IC card of a third embodiment of the present invention is constructed in this way.

Figure 5:
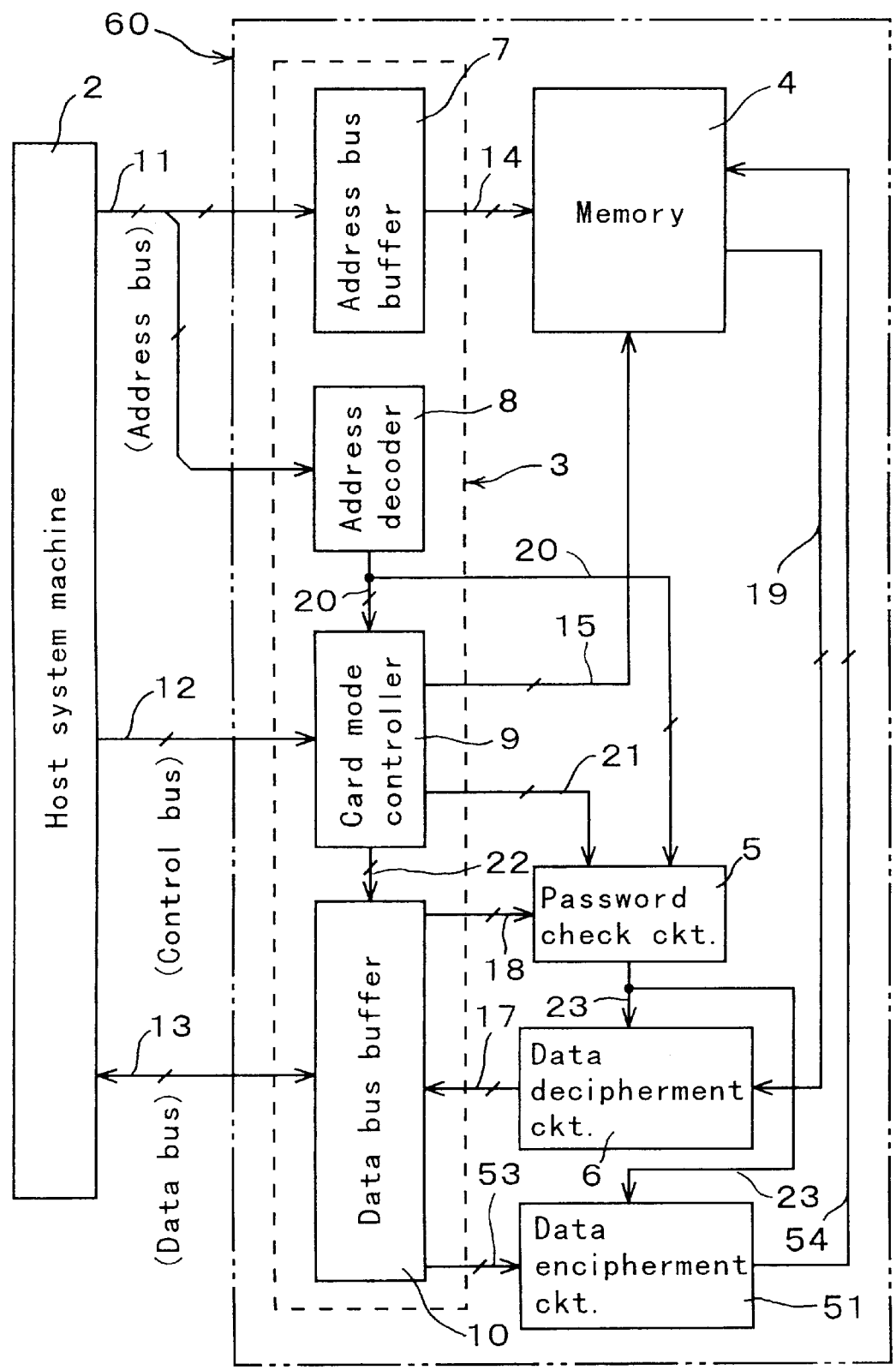
FIG. 5 is a block diagram illustrating an example of IC memory card according to a third embodiment of the present invention.

FIG. 5 is a block diagram illustrating an example of IC memory cards in the third embodiment of the present invention. In FIG. 5, the same components as in FIG. 1 or 2 are denoted by the same numerals, and their descriptions are omitted here.

The IC card of FIG. 5 differs from that of FIG. 1 as follows. The internal data bus 16 of FIG. 1 has been abolished. The data encipherment circuit 51 and internal data buses 53, 54 are added to the IC memory card 1 of FIG. 1. The IC memory card 1 has been changed into an IC memory card 60 with these changes. Consequently, in FIG. 5, IC memory card 60 comprises an interface section 3, a memory section 4, a password check circuit 5, a data decipherment circuit 6, and a data encipherment circuit 51 that enciphers data.

Data bus buffer 10 of interface section 3 is connected to data encipherment circuit 51 through an internal data bus 53. Data encipherment circuit 51 is connected to memory section 4 through an internal data bus 54. Password check circuit 5 is connected in parallel to data decipherment circuit 6 and data encipherment circuit 51 through a signal line 23.

Data bus buffer 10 performs I/O control, in data bus 13 and internal data buses 17, 18, and 53, based on an I/O control signal input from card mode controller 9. Further, data in memory section 4 is read out into host system apparatus 2 through internal data bus 19, based on the address data input through internal address bus 14 and a memory control signal input through signal lines 15. Also, data from host system apparatus 2 is written in memory section 4 through internal data bus 54. Here, non-enciphered data can also be read out from memory section 4 and written in memory section 4. In this construction, the operation of writing in and reading from memory section 4 using password check circuit 1, data decipherment circuit 6, and data encipherment circuit 51 is the same as in the first and second embodiment, so that its description is omitted here.

In this way, an IC memory card of the present third embodiment can internally perform encipherment and decipherment of data. Further, the present embodiment uses an I/O function complying with PC card standards to check a password input from host system apparatus 2. The IC memory card enciphers data input from host system apparatus 2 to write the enciphered data in memory section 4 and deciphers data read out from memory section 4 to output the deciphered data to host system apparatus 2, only if the password data input from host system apparatus 2 coincides with predetermined password data set beforehand. If, the password data do not coincide, then the IC memory card does not encipher the data input from host system apparatus 2 and directly writes in memory section 4, and does not decipher the data read out from memory section 4 and directly outputs the data to host system apparatus 2.

According to the present third embodiment, data is enciphered to be stored in the IC memory card and deciphered to be output to the host system apparatus by only a system apparatus or operators knowing a predetermined password, so that the security of data can be protected. Further, data can be stored in the IC memory card without encipherment and can be output without decipherment, so that the IC memory card can be used as an ordinary PC card complying with PC card standards, and the universality of the IC memory card is great. Further, the operation of checking the password is performed comparably easily and effectively using the I/O function complying with PC card standards. Finally, data does not need to be enciphered or deciphered in the host system apparatus, so that the load of the host system apparatus can be reduced.

Fourth Embodiment.

In the above first to third embodiments of the present invention, data words 40 to 47 for comparison are set beforehand, so that they cannot be altered by the host system apparatus 2. However, an IC memory card may be designed so that the data words for comparison can be rewritten by host system apparatus 2. An IC card of a fourth embodiment of the present invention is constructed in this way. The fourth embodiment described in the following is constructed from the IC memory card of the first embodiment, but similar improvements can be achieved from the IC memory cards of the second and third embodiments.

Figure 6:
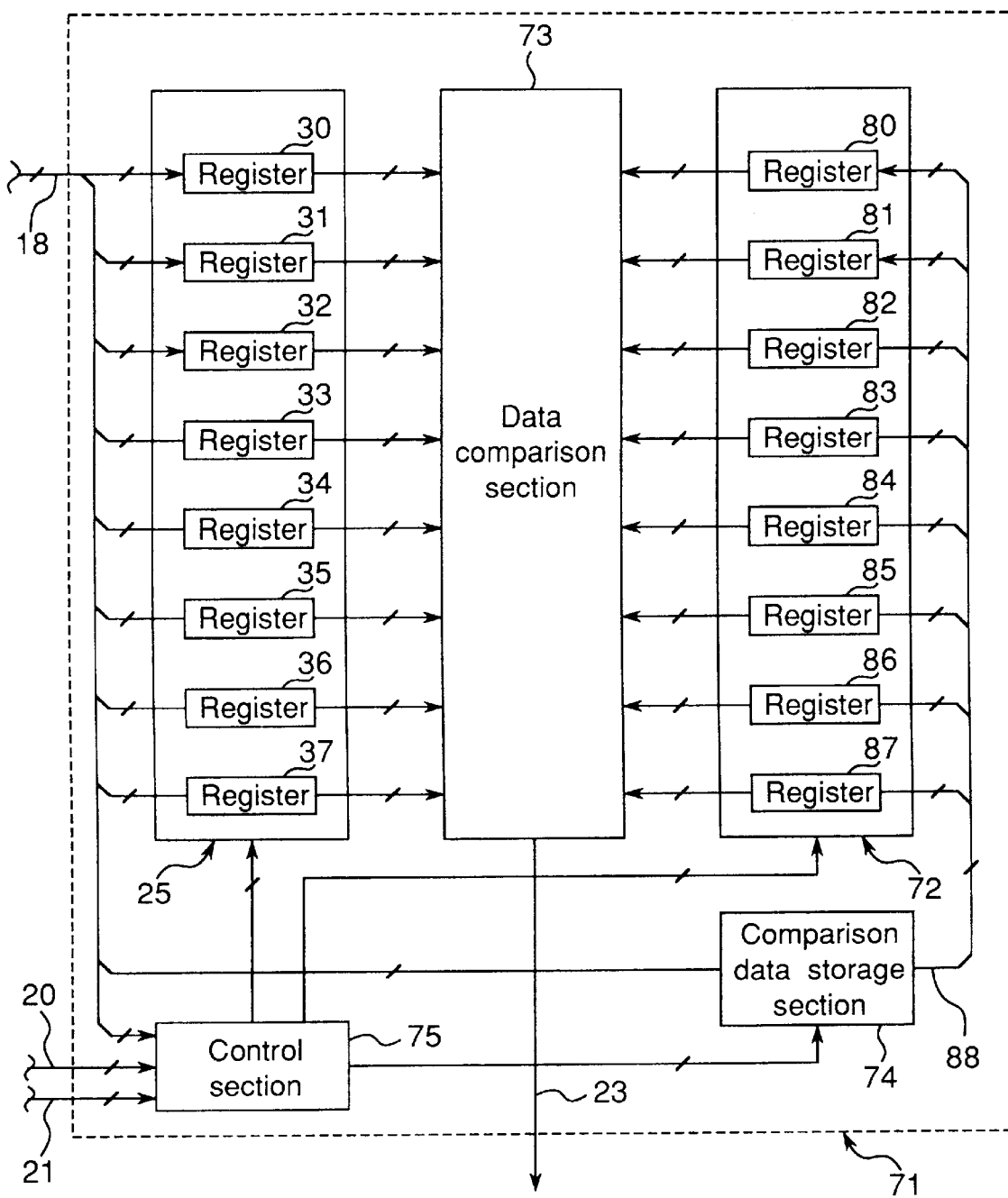
FIG. 6 is a block diagram illustrating an example of the password check circuit 4 in the IC memory card according to a fourth embodiment of the present invention.

A block diagram of the IC memory card of the fourth embodiment is the same as FIG. 1 except the fact that the password check circuit 5 has been changed into a password check circuit 71, and the IC memory card 1 of FIG. 1 has been changed into an IC memory card 70. FIG. 6 is a block diagram illustrating an example of password check circuit 4 in the IC memory card of the fourth embodiment. In FIG. 6, the same components as in FIGS. 1 and 2 are denoted by the same numerals.

In FIG. 6, password check circuit 71 comprises a check-data register section 25 consisting of registers 30 to 37, each of which latches a data piece of a password sent from host system apparatus 2 and input from an internal data bus 18, a comparison-data register section 72 consisting of a plurality of registers, each of which laches a piece of password data for comparison to judge whether the input password is correct or not, a data comparison section 73 consisting in a comparator that compares the password data latched in check-data register section 25 with the password data for comparison latched in comparison-data register section 72, a comparison-data storage section 74 consisting in rewritable ROM, which stores password data for comparison to be latched in the registers of comparison-data register section 72, and a control section 75 that controls the operation of comparison-data storage section 74 as well as the latching operation of check-data register section 25 and comparison-data register section 72.

Each of registers 30 to 37 of check-data register section 25 is connected in parallel to internal data bus 18 and also to control section 75. Further, each of registers 30 to 37 is connected to data comparison section 73. Comparison-data register section 72 comprises eight 8-bit registers 80 to 87 and can latch 8-byte data. Each of registers 80 to 87 is connected to comparison-data storage section 74 through internal data bus 88 and also to control section 75 in parallel.

Each of registers 80 to 87 is connected to data comparison section 73, which is connected to data decipherment circuit 6 through signal line 23. Control section 75 is connected to internal data bus 18 and also connected to address decoder 8 through signal lines 20. Further, control section 75 is connected to card mode controller 9 through signal lines 21 and also connected to comparison-data storage section 74 through signal lines 23. Comparison-data storage section 74 is connected to internal data bus 18.

Check-data register section 25 and comparison-data register section 72 form a standard I/O space for access, using an I/O function complying with PC card standards. For example, registers 30 and 80 share 1F0h as their I/O address; registers 31 and 81 share 1F1h; registers 32 and 82 share 1F2h; registers 33 and 83 share 1F3h; registers 34 and 94 share 1F4h; registers 35 and 85 share 1F5h; registers 36 and 86 share 1F6h; and registers 37 and 87 share 1F7h.

Further the ROM of comparison-data storage section 74 shares the I/O addresses with check-data register section 25 and comparison-data register section 72. For example, in the ROM, the data word to be latched in register 80 is stored at 1F0h; data word to be latched in register 81 is stored at 1F1h; data word to be latched in register 82 is stored at 1F2h; data word to be latched in register 83 is stored at 1F3h; data word to be latched in register 84 is stored at 1F4h; data word to be latched in register 85 is stored at 1F5h; data word to be latched in register 86 is stored at 1F6h; and data word to be latched in register 87 is stored at 1F7h.

Figure 7:
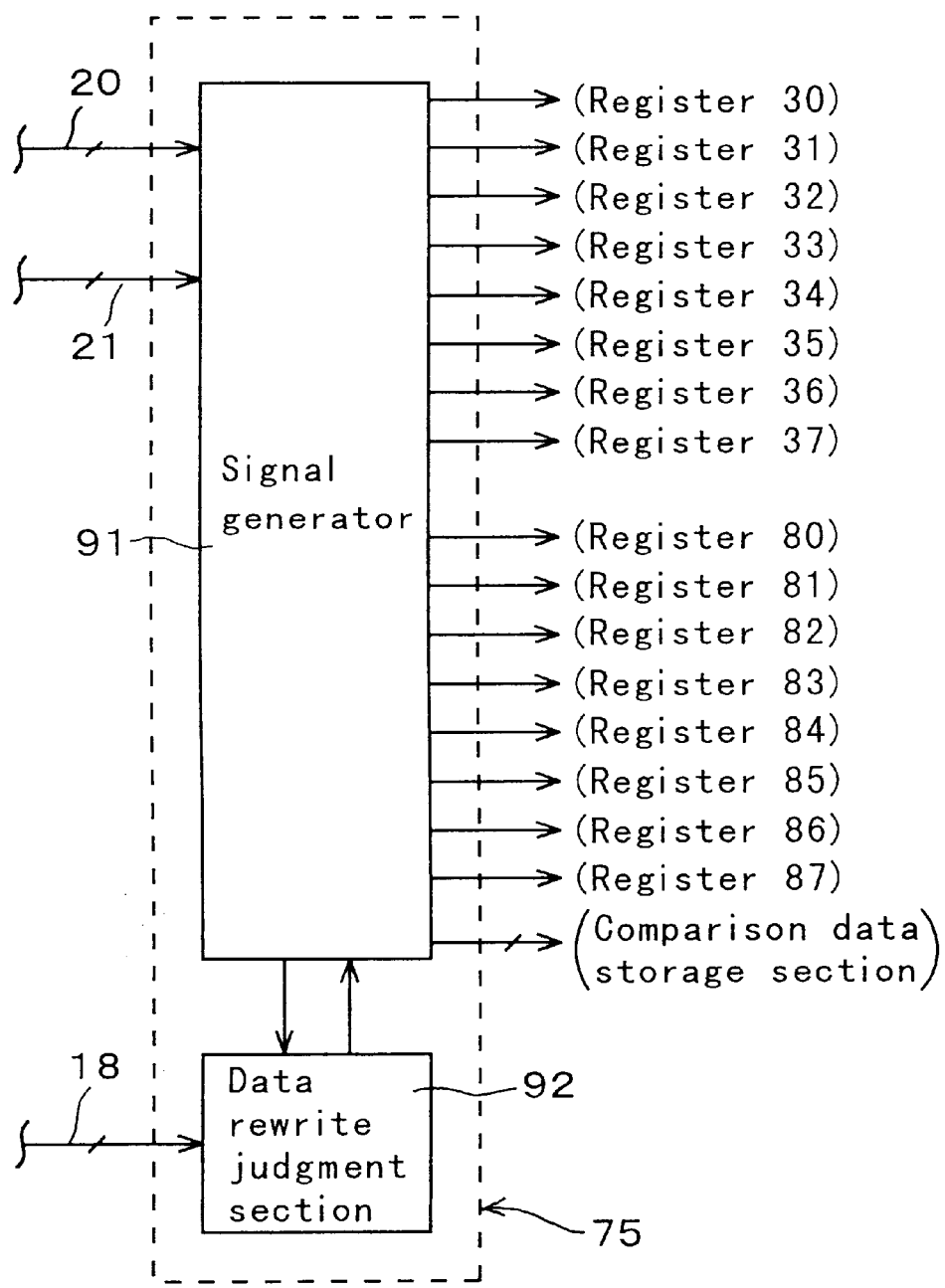
FIG. 7 is a block diagram illustrating an example of the control section 75 in FIG. 6.

FIG. 7 is a block diagram illustrating an example of control section 75. In FIG. 7, control section 75 includes a signal generator 91 that generates select signals for registers 30 to 37 of check-data register section 25 and registers 80 to 87 of comparison-data register section 72 and also generates a control signal for comparison-data storage section 74 and a data-rewrite judgment section 92 that determines whether the rewriting of password data for comparison stored in comparison-data storage section 74 is performed or not. Signal generator 91 is connected to address decoder 8 through signal lines 20 and also connected to card mode controller 9 through signal lines 21. Data-rewrite judgment section 92 is connected to internal data bus 18 and signal generator 91.

Data-rewrite judgment section 92 has a register that forms a standard I/O space for access, using an I/O function complying with PC card standards. For example, the register has the I/O address 3F6h. Data-rewrite judgment section 92 checks whether the password data for rewrite input from host system apparatus 2 coincides with predetermined data for comparison set beforehand. When the password data for comparison stored in comparison-data storage section 74 is to be rewritten, data-rewrite judgment section 92 outputs a rewrite permission signal that permits the rewriting of the password data stored in comparison-data storage section 74, if and only if the data coincide. Signal generator 91 generates and outputs into comparison data storage section 74 a write access signal, following the request of host system apparatus 2 for password rewrite, if and only if signal generator 91 receives the rewrite permission signal from data-rewrite judgment section 92.

The operation of checking a password against the password for comparison in the above construction is described in the following. In FIGS. 6 and 7, when host system apparatus 2 gains read access to the addresses of registers 80 to 67, card mode controller 9 outputs a password-check control signal for enabling comparison-data register section 72 into signal generator 91 of control section 75.

When receiving the password-check control signal for enabling comparison data storage register 72 from card mode controller 9, signal generator 91 generates a select signal that selects the register of the address indicated by the decoded address signal input from address decoder 8. Signal generator 91 outputs a select signal into comparison-data register section 72 and generates and outputs into comparison-data storage section 74 a read access signal comprising the address data, a chip-enable signal, a write-enable signal, and an output-enable signal to read out the data stored in the address indicated by the decoded address signal.

For example, if the decoded address signal input to signal generator 91 from address decoder 8 indicates the I/O address 1F0h, then signal generator 91 generates and outputs into comparison-data register section 72 a select signal that selects register 80. That is, the select signal is output into register 80. At the same time, signal generator 91 generates and outputs into comparison-data storage section 74 a read access signal comprising the address data, a chip-enable signal, a write-enable signal, and an output-enable signal to read out the data stored at the address 1F0h. Consequently, the data stored at the address 1F0h in comparison-data storage section 74 is latched in register 80.

Similarly, the data stored at the address 1F1h in comparison-data storage section 74 is latched in register 81; the data stored at the address 1F2h is latched in register 82; the data stored at the address 1F3h is latched in register 83; the data stored at the address 1F4h is latched in register 84;

the data stored at the address 1F5h is latched in register 85; the data stored at the address 1F6h is latched in register 86; and the data stored at the address 1F7h is latched in register 87. In this way, the password data for comparison stored in comparison-data storage section 74 is read out and latched in the registers of comparison-data register section 72.

Next, when host system apparatus 2 gains write access to the addresses of the registers 30 to 37, that is, access to the standard I/O space, card mode controller 9 outputs a password-check control signal for enabling check-data register section 25 into signal generator 91 of control section 75. When receiving the password-check control signal for enabling check-data register section 25 from card mode controller 9, signal generator 91 generates and outputs into check-data register section 25 a select signal that selects the register of the address indicated by the decoded address signal input from address decoder 8. At this time, the data input through internal data bus 18 is latched in the register selected by the select signal.

For example, if the decoded address signal input from address decoder 8 indicates the address of register 30, then signal generator 91 generates and outputs into register 30 a select signal. Register 30 latches the input data through internal data bus 18. Similarly, data is latched in register 31 to 37, so that the password data for data decipherment input from host system apparatus 2 is latched in registers 30 to 37.

Data comparison section 73 compares the data latched in register 30 with the data latched in register 80, the data latched in register 31 with the data latched in register 81, the data latched in register 32 with the data latched in register 82, the data latched in register 33 with the data latched in register 83, the data latched in register 34 with the data latched in register 84, the data latched in register 35 with the data latched in register 85, the data latched in register 36 with the data latched in register 86, and the data latched in register 37 with the data latched in register 87.

As a result of the comparison, if the password data latched in check-data register section 25 and the password data for comparison latched in comparison-data register section 72 coincide, then data comparison section 73 outputs a predetermined enable signal into data decipherment circuit 6. If the password data do not coincide, then data comparison section 73 terminates the output of an enable signal. Data decipherment circuit 6 deciphers the data input from memory section 4 through internal data bus 19, only if data decipherment circuit 6 receives an enable signal from data comparison section 73 through signal line 23. Data decipherment circuit 6 outputs the deciphered data to host system apparatus 2 through internal data bus 17, data bus buffer 10, and data bus 13.

Further, data decipherment circuit 6 outputs the data input from memory section 4 without decipherment to host system apparatus 2 through internal data bus 17, data bus buffer 10, if data decipherment circuit 6 does not receive an enable signal. Here, the encipherment and decipherment of data are performed by publicly known methods such as with Reed-Solomon codes or the like, so that their descriptions are omitted. Data comparison section 73 always performs the comparison of the data in registers 30 to 37 of check-data register section 25 with the data in registers 80 to 87 of comparison-data register section 72.

Figure 8:
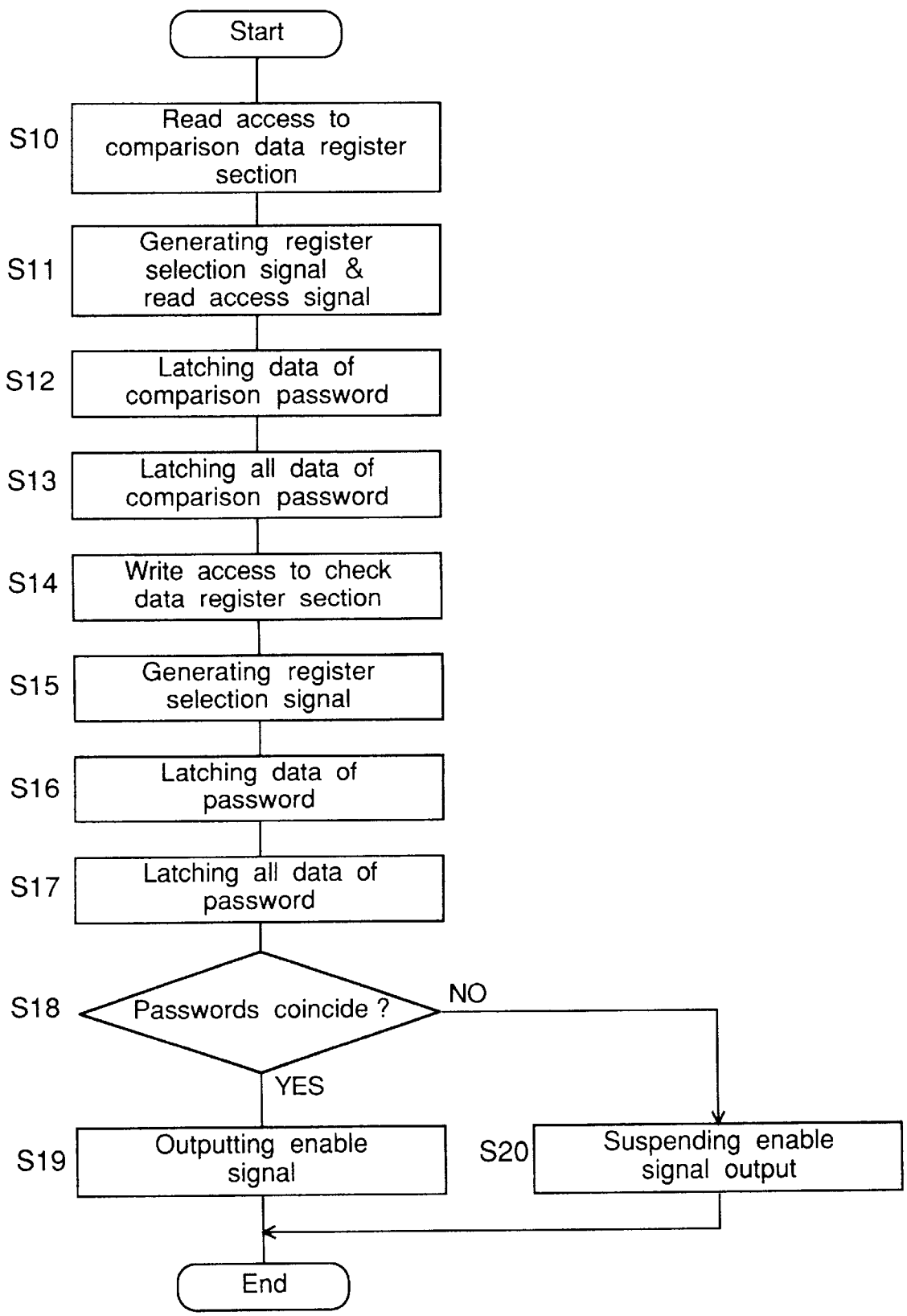
FIG. 8 is a flowchart showing an example of checking operation in the password check circuit 71 illustrated in FIGS. 6 and 7.

FIG. 8 is a flowchart showing an example of the checking operation in password check circuit 71 illustrated in FIGS. 6 and 7. In FIG. 8, first in step S10, host system apparatus 2 gains write access to the addresses of registers 80 to 87. Signal generator 91 of control section 91 receives the password-check control signal for enabling comparison-data register section 72 from card mode controller 9 and also receives the decoded address signal from address decoder 8.

Next in step S11, signal generator 91 generates a select signal for selecting the address indicated by the decoded address signal. Signal generator 91 also generates a read access signal comprising the address data, a chip-enable signal, a write-enable signal, and an output-enable signal to read out the data stored at the address indicated by the decoded address signal. Then in step S12, signal generator 91 outputs the generated select signal into the register of comparison-data register 72, and outputs the generated read access signal into comparison-data storage section 74. The register of comparison-data register 72 latches the data stored in comparison-data storage section 74 input through internal data bus 88.

Next, in step S13, the procedure of the above steps S10 to S12 is repeated so that all the registers 80 to 87 of comparison-data register section 72 latch their corresponding data words of the password for comparison stored in comparison-data storage section 74. In step S14, host system apparatus 2 gains write access to the addresses of registers 30 to 37. Signal generator 91 receives the password-check control signal from card mode controller 9 to enable check-data register section 25. Signal generator 91 also receives the decoded address signal from address decoder 8.

In step S15, signal generator 91 generates a select signal for selecting the register of the address in check-data register section 25 indicated by the decoded address signal. In step S16, signal generator 91 outputs the generated select signal into the register of check-data register section 25. The register of check-data register section 25 selected by the select signal latches a data word of the password input through internal data bus 18. Next in step S17, the procedure from the above steps S14 to S16 is repeated so that all the registers 30 to 37 of check-data register section 25 latch all the data words of the password input from host system apparatus 2 through internal data bus 18.

In step S18, data-comparison section 73 compares the password data latched in the registers 30 to 37 of check-data register section 25 with the password data for comparison latched in the registers 80 to 87 in comparison-data register section 72 to test whether the compared data coincide. If they coincide (YES), then the flow proceeds with step S19. In step S19, data comparison section 73 outputs an enable signal into data decipherment circuit 6, so that data decipherment circuit 6 deciphers the data input from memory section 4, and the flow is terminated. If the compared data do not coincide in S18 (NO), then in step S20, data comparison section 73 terminates the output of an enable signal for data decipherment circuit 6, so that data decipherment circuit 6 does not decipher the data input from memory section 4, and the flow is terminated.

Next, the operation of rewriting the password data for comparison stored in comparison-data storage section 74 is described in the following. In FIGS. 6 and 7, when host system apparatus 2 gains write access to the address 3F6h of the register in data-rewrite judgment section 92, that is, the I/O address 3F6h, card mode controller 9 outputs an enable signal for enabling the register of data-rewrite judgment section 92 into signal generator 91 through signal lines 21. Signal generator 91 generates a select signal for selecting the register of data-rewrite judgment section 92, from the decoded address signal that is input from address decoder 8 through signal lines 20 and indicates the I/O address 3F6h and the enable signal for enabling the register of data-rewrite section 92.

Further, signal generator 91 outputs the generated select signal into the register of data-rewrite judgment section 92.

The register of data-rewrite judgment section 92 latches password data for data rewrite input through internal data bus 18. Then, data-rewrite judgment section 92 compares the password data for data rewrite latched in the register with predetermined data for comparison set beforehand. If the data coincide, then data-rewrite judgment section 92 outputs into signal generator 91 a rewrite permission signal that permits the rewriting of the password data for comparison stored in comparison-data storage section 74. When receiving the rewrite permission signal, signal generator 91 generates and outputs into comparison-data storage section 74 a write access signal comprising the address data, a chip-enable signal, an output-enable signal, and a write-enable signal for write operation.

Next, comparison-data storage section 74 stores at an assigned address the data input from host system apparatus 2 through internal data bus 18. If the password data for data rewrite latched in the register and predetermined data for comparison set beforehand do not coincide, then data-rewrite judgment section 92 terminates the output of the rewrite permission signal into signal generator 91. In this case, signal generator 91 does not output the write access signal into comparison-data storage section 74, so that comparison-data storage section 74 does not write the data input from host system apparatus 2 through internal data bus 18. Therefore, host system apparatus 2 cannot perform the rewriting of the password data for comparison stored in comparison-data storage section 74.

Figure 9:
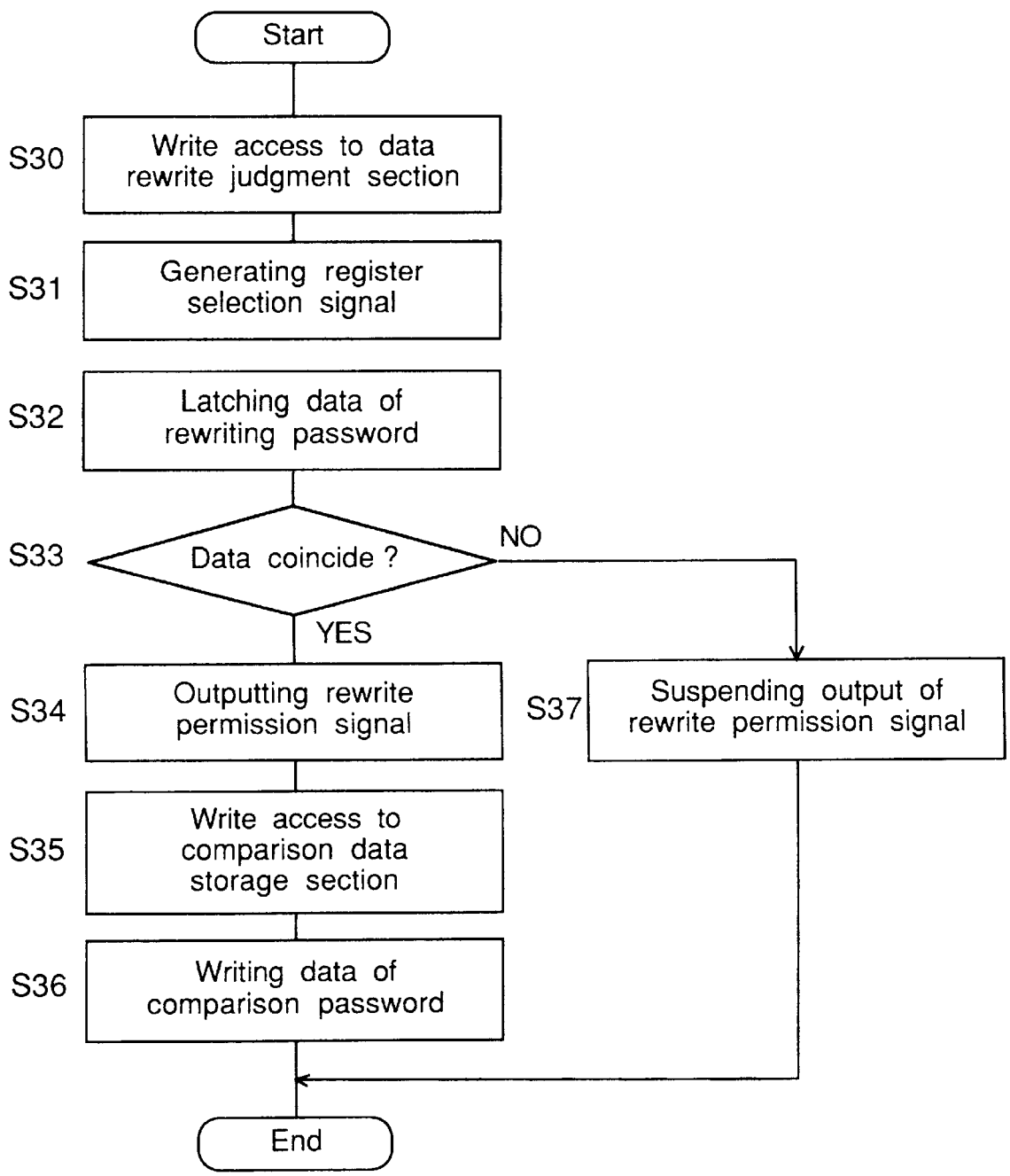
FIG. 9 is a flowchart showing an example of the operation in the password check circuit 71 for rewriting the password data for comparison stored in the comparison-data storage section 74.
Figure 10:
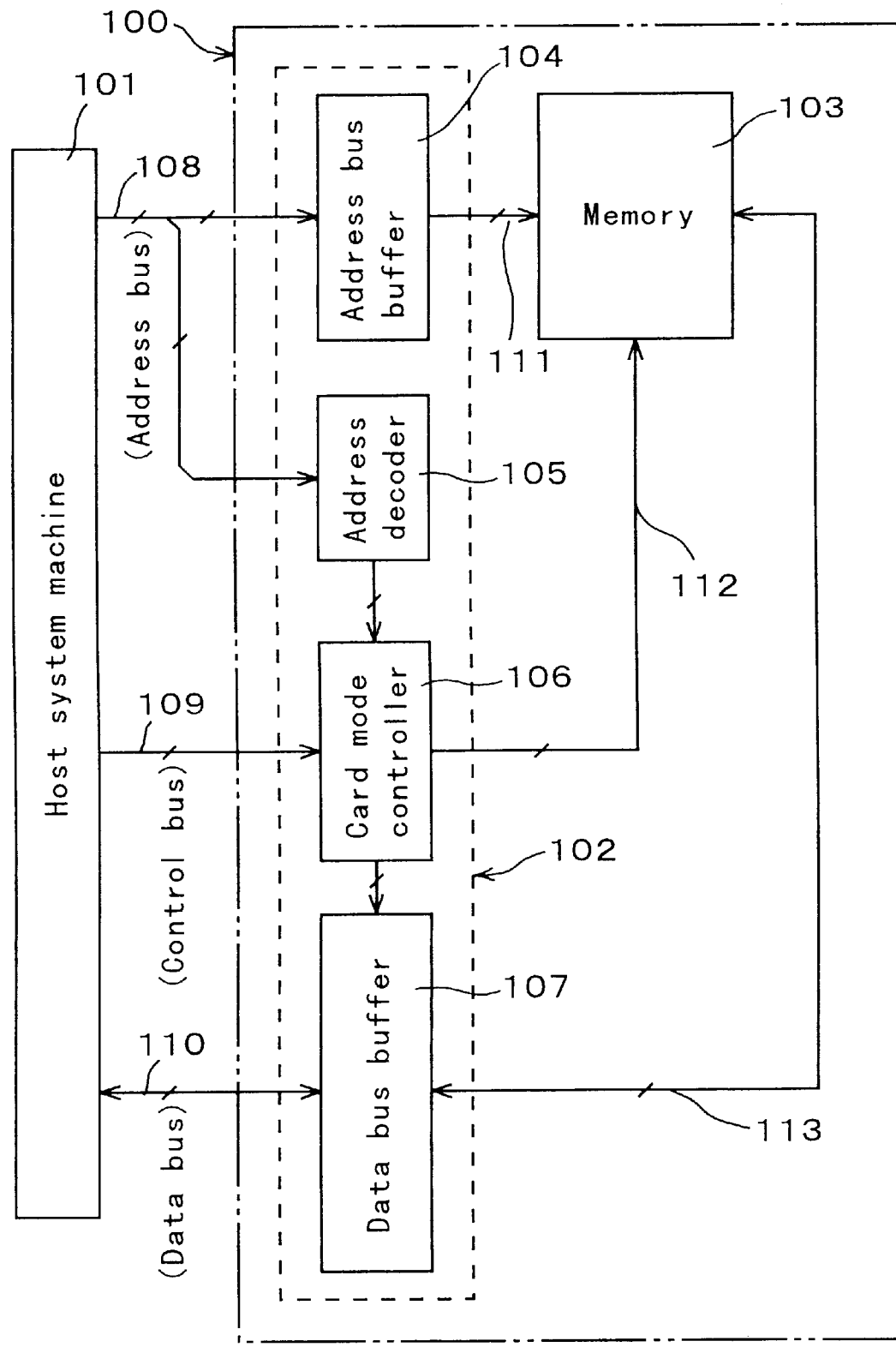
FIG. 10 is a block diagram illustrating an example of prior IC memory card.

FIG. 9 is a flowchart showing an example of the operation of password check circuit 71 for rewriting the password data for comparison stored in comparison-data storage section 74. In FIG. 9, first in step S30, host system apparatus 2 gains write access to the address of the register in data-rewrite judgment section 92, that is, the I/O address 3F6h.

Next, in step S31, card mode controller 9 outputs an enable signal for enabling the register of data-rewrite judgment section 92 into signal generator 91 through signal lines 21. Signal generator 91 generates a select signal for selecting the register of data-rewrite judgment section 92, from the decoded address signal, which has been input from address decoder 8 through signal lines 20 and indicates the I/O address 3F6h, and the enable signal for enabling the register of data-rewrite section 92. Signal generator 91 then outputs the select signal into data-rewrite judgment section 92.

In step S32, data-rewrite judgment section 92 latches password data for data rewrite input from host system apparatus 2 through internal data bus 18. Then, in step S33, data-rewrite judgment section 92 compares the latched password data for data rewrite with the predetermined data for comparison set beforehand. If the data coincide (YES), then in step S34, data-rewrite judgment section 92 outputs into signal generator 91 the rewrite permission signal that permits the rewriting of the password data for comparison stored in comparison-data storage section 74. In step S35, signal generator 91 generates and outputs into comparison-data storage section 74 the write access signal comprising the address data, a chip-enable signal, an output-enable signal, and a write-enable signal for write operation.

Next, in step S36, comparison-data storage section 74 stores at an assigned address the data input from host system apparatus 2 through internal data bus 18. In this way, the flow rewrites the password data for comparison stored in comparison-data storage section 74 and terminates. If the password data for data rewrite latched in the register and the predetermined data for comparison set beforehand do not coincide (NO), then in step S37, data-rewrite judgment section 92 terminates the output of the rewrite permission signal into signal generator 91. In this case, signal generator 91 does not output the write access signal into comparison-data storage section 74, and the flow terminates without rewriting the password data for comparison stored in comparison-data storage section 74.

In this way, an IC memory card of the present fourth embodiment rewrites the password data for comparison stored in comparison-data storage section 74, if and only if the result of checking the password for data rewrite is positive. Therefore, data is enciphered and/or deciphered by only a system apparatus or operators knowing a predetermined password. Also, the password data for comparison can be rewritten. Therefore, the security of data can be protected. Further, the IC memory card can be used as an ordinary PC card complying with PC card standards, so that the universality of the IC memory card is great. Further, the operation of checking the password is performed comparably easily and effectively using the I/O function complying with PC card standards. Finally, data does not need to be enciphered and deciphered in the host system apparatus, so that the load of the host system apparatus can be reduced.

In the above first to fourth embodiments, the password is composed of an 8-byte word. However, the present invention does not limit the length of the password and allows any length that can be stored in a standard I/O space complying with PC standards.

An IC memory card in accordance with the first facet of the present invention can internally perform data decipherment. Further, the IC memory card deciphers the data read out from the memory section to output the deciphered data to the host system apparatus, only if the password data input from the host system apparatus coincides with predetermined password data set beforehand. If the password data do not coincide, then the IC memory card does not decipher the data read out from the memory section and directly outputs the data to the host system apparatus. Therefore, the enciphered data stored in the IC memory card can be deciphered by only a system apparatus or operators knowing a predetermined password, so that the security of data can be protected. Further, the IC memory card can be used as an ordinary PC card complying with PC card standards by storing non-enciphered data in the IC memory card, so that the universality of the IC memory card is great. Further, the host system apparatus does not need to decipher enciphered data, so that its load can be reduced.

An IC memory card in accordance with the second facet of the present invention can internally perform data encipherment. Further, the IC memory card enciphers the data input from the host system apparatus to write in the memory section, only if the password data input from the host system apparatus coincides with predetermined password data set beforehand. If the password data do not coincide, then the IC memory card does not encipher the data input from the host system apparatus and directly writes in the memory section. Therefore, data is enciphered and stored in the IC memory card by only a system apparatus or operators knowing a predetermined password, so that the security of data can be protected. Further, the IC memory card can be used as an ordinary PC card complying with PC card standards by storing data without encipherment in the IC memory card, so that the universality of the IC memory card is great. Further, the host system apparatus does not need to encipher data, so that its load can be reduced.

An IC memory card in accordance with the third facet of the present invention is equipped with a data decipherment circuit in the second facet of the present invention. The data decipherment circuit deciphers the data read out from the memory section to output the deciphered data to the host system apparatus, only if the password data input from the host system apparatus coincides with predetermined password data set beforehand. Therefore, data is enciphered and stored in the IC memory card by only a system apparatus or operators knowing a predetermined password, and the enciphered data stored in the IC memory card can be deciphered by only a system apparatus or operators knowing a predetermined password. Therefore, the security of data can be protected. Further, the PC memory card can store data without encipherment and outputs the stored data without decipherment. Therefore, the IC memory card can be used as an ordinary PC card complying with PC card standards, so that the universality of the IC memory card is great. Further, the host system apparatus does not need to perform encipherment and/or decipherment of data, so that its load can be reduced.

According to an IC memory card of the fourth facet of the present invention, in an IC memory card of the above first to third facets of the present invention, the password check circuit comprises a check-data register section consisting of a plurality of registers, each of which latches a data piece of a password input from the host system apparatus, a register controller that controls the latching operation of the check-data register section, a comparison-data setting section in which predetermined password data for comparison is set beforehand, and a data comparison section that compares the password data latched in the check-data register section with the password data for comparison set in the comparison-data setting section to output the comparison result, which becomes the password comparison result. Therefore, data is enciphered and/or deciphered by only a system apparatus or operators knowing a predetermined password, so that the security of data can be protected. Further, the PC memory card can be used without encipherment and decipherment as an ordinary IC memory card complying with PC standards, so that the universality of the IC memory card is great. Further, the host system apparatus does not need to perform encipherment and/or decipherment of data, so that its load can be reduced.

According to the fifth facet of the present invention, in an IC memory card of the fourth facet of the present invention, each piece of data forming the predetermined password for comparison is set in the comparison-data setting section, corresponding to each data piece that has been latched in each register of the check-data register section. Therefore, data is enciphered and/or deciphered by only a system apparatus or operators knowing a predetermined password, so that the security of data can be protected. Further, the PC memory card can be used without encipherment and decipherment as an ordinary IC memory card complying with PC standards, so that the universality of the IC memory card is great. Further, the host system apparatus does not need to perform encipherment and/or decipherment of data, so that its load can be reduced.

According to the sixth facet of the present invention, in an IC memory card of the fourth and fifth facets of the present invention, the register controller generates a control signal from the address data and a card-mode control signal, which are input from the host system apparatus, and outputs the control signal into the check-data register section, which is controlled by the control signal. Therefore, data is enciphered and/or deciphered by only a system apparatus or operators knowing a predetermined password, so that the security of data can be protected. Further, the PC memory card can be used without encipherment and decipherment as an ordinary IC memory card complying with PC card standard, so that the universality of the IC memory card is great. Further, the host system apparatus does not need to perform encipherment and/or decipherment of data, so that its load can be reduced.

According to the seventh facet of the present invention, in an IC memory card of the fourth to sixth facets of the present invention, the check-data register section forms a standard I/O space for access, using an I/O function complying with PC card standards. Therefore, data is enciphered and/or deciphered by only a system apparatus or operators knowing a predetermined password, so that the security of data can be protected. Further, the operation of checking the password is performed comparably easily and effectively using the I/O function complying with PC card standards. Further, the PC memory card can be used without encipherment and decipherment as an ordinary IC memory card complying with PC standards, so that the universality of the IC memory card is great. Further, the host system apparatus does not need to perform encipherment and/or decipherment of data, so that its load can be reduced.

According to the eighth facet of the present invention, in an IC memory card of the first to third facets of the present invention, the password check circuit comprises a check-data register section consisting of a plurality of registers, each of which latches a data piece of a password input from the host system apparatus, a check-data storage section consisting in rewritable ROM in which password data for comparison is stored, a comparison-data register section consisting of a plurality of registers, each of which latches a data piece of a password for comparison stored in the comparison-data storage section, a control section that controls the operation of the comparison-data storage section as well as the latching operation of the check-data register section and comparison-data register section, and a data comparison section that compares the password data latched in the check-data register section with the password data for comparison latched in the comparison-data register section to output the comparison result, which becomes the password comparison result. Therefore, data is enciphered and/ or deciphered by only a system apparatus or operators knowing a predetermined password. Further, the password data for comparison can be rewritten. Therefore, the security of data can be further protected. Further, the PC memory card can be used as an ordinary IC memory card complying with PC standards, so that the universality of the IC memory card is great. Further, the host system apparatus does not need to perform encipherment and/or decipherment of data, so that its load can be reduced.

According to the ninth facet of the present invention, in an IC memory card of the eighth facet of the present invention, the comparison-data register section latches in its each register each piece of data forming the predetermined password for comparison and stored in the comparison-data storage section, corresponding to each data piece that has been latched in each register of the check-data register section. Therefore, data is enciphered and/or deciphered by only a system apparatus or operators knowing a predetermined password. Further, the password data for comparison can be rewritten. Therefore, the security of data can be further protected. Further, the PC memory card can be used as an ordinary IC memory card complying with PC standards, so that the universality of the IC memory card is great. Further, the host system apparatus does not need to perform encipherment and/or decipherment of data, so that its load can be reduced.

According to the tenth facet of the present invention, in an IC memory card of the eighth and ninth facets of the present invention, the check-data register section, comparison-data storage section, and comparison-data register section form a standard I/O space for access, using an I/O function complying with PC card standards and share with each other the addresses of the standard I/O space. Therefore, data is enciphered and/or deciphered by only a system apparatus or operators knowing a predetermined password. Further, the password data for comparison can be rewritten. Therefore, the security of data can be further protected. Further, the PC memory card can be used as an ordinary IC memory card complying with PC standards, so that the universality of the IC memory card is great. Further, the operation of checking the password is performed comparably easily and effectively using the I/O function complying with PC card standards. Further, the host system apparatus does not need to perform encipherment and/or decipherment of data, so that its load can be reduced.

According to the eleventh facet of the present invention, in an IC memory card of the eighth to tenth facets of the present invention, the control section comprises a signal generator that generates control signals from the address data and a card-mode control signal that are input from the host system apparatus, each of the control signals being output into each of the check-data register section, the comparison-data register section, and the comparison-data storage section, which are controlled thereby respectively and a data-rewrite judgment section that decides whether to allow the data rewriting of the password data for comparison by checking password data for data rewrite input from the host system apparatus. The signal generator outputs a control signal for rewrite operation to the comparison-data storage section, only when the data-rewrite judgment section decides to allow the rewriting of the password data for comparison. Therefore, data is enciphered and/or deciphered by only a system apparatus or operators knowing a predetermined password. Further, the password data for comparison can be rewritten. Therefore, the security of data can be further protected. Further, the PC memory card can be used as an ordinary IC memory card complying with PC standards, so that the universality of the IC memory card is great. Further, the host system apparatus does not need to perform encipherment and/or decipherment of data, so that its load can be reduced.

According to the twelfth facet of the present invention, in an IC memory card of the eleventh facet of the present invention, the data-rewrite judgment section has a register that forms a standard I/O space for access, using an I/O function complying with PC card standards, and latches the password data for data rewrite in the registers. The data-rewrite judgement section then compares the latched password data for data rewrite with preset data for comparison to decide to allow the rewriting of the password data for comparison, only when the compared data coincide. Therefore, data is enciphered and/or deciphered by only a system apparatus or operators knowing a predetermined password. Further, the password data for comparison can be rewritten. Therefore, the security of data can be further protected. Further, the PC memory card can be used as an ordinary IC memory card complying with PC standards, so that the universality of the IC memory card is great. Further, the operation of checking the password is performed comparably easily and effectively using the I/O function complying with PC card standards. Further, the host system apparatus does not need to perform encipherment and/or decipherment of data, so that its load can be reduced.

Although the present invention has been fully described in connection with the preferred embodiments thereof and the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An IC memory card having an interface section for connecting the IC memory card to an external host system apparatus as an information processing apparatus and a memory section for storing data including enciphered data which are sent from the external host system apparatus through the interface section, the IC memory card comprising:

a password check circuit that compares a password input from the host system apparatus with a predetermined password to output a password comparison result, and a data decipherment circuit that deciphers the enciphered data read out from the memory section and outputs deciphered data to the host system apparatus through the interface section, if the passwords coincide with each other, said data decipherment circuit outputting the enciphered data read out from the memory section, without decipherment, to the host system apparatus through the interface section if the passwords do not coincide with each other, wherein the enciphered data that is deciphered by said data decipherment circuit when the passwords coincide with each other is the same enciphered data output from said data decipherment circuit when the passwords do not coincide with each other.

2. The IC memory card as defined in claim 1, wherein said password check circuit includes:

a check-data register section having a plurality of registers, each of which latches a data piece of the password input from the host system apparatus, a register controller that controls the latching operation of said check-data register section, a comparison-data setting section in which predetermined password data for comparison is set beforehand, and a data comparison section that compares the password data latched in said check-data register section with the password data for comparison set in said comparison-data setting section to output a comparison result as the password comparison result.

3. The IC memory card as defined in claim 2, wherein said register controller generates a control signal from address data and a card-mode control signal, which are input from the host system apparatus, and outputs the control signal into said check-data register section, which is controlled by the control signal.

4. The IC memory card as defined in claim 2, wherein said check-data register section forms an I/O space for access.

5. The IC memory card as defined in claim 1, wherein said password check circuit includes:

a check-data register section having a plurality of registers, each of which latches a data piece of the password input from the host system apparatus, a comparison-data storage section having a rewritable ROM in which password data for comparison is stored, a comparison-data register section having a plurality of registers, each of which latches a data piece of the password for comparison stored in said comparison-data storage section, a control section that controls the operation of said comparison-data storage section as well as the latching operation of said check-data register section and said comparison-data register section, and a data comparison section that compares the password data latched in said check-data register section with the password data for comparison latched in said comparison-data register section to output the comparison result, which becomes the password comparison result.

6. The IC memory card as defined in claim 5, wherein said check-data register section, said comparison-data storage section, and said comparison-data register section form an I/O space for access and share with each other the addresses of the I/O space.

7. The IC memory card as defined in claim 5, wherein said control section includes:

a signal generator that generates control signals from address data and a card-mode control signal that are input from the host system apparatus, each of the control signals being output into each of said check-data register section, said comparison-data register section, and said comparison-data storage sections, which are controlled thereby respectively, and a data-rewrite judgment section that decides whether to allow the rewriting of the password data for comparison by checking password data for data rewrite input from the host system apparatus, said signal generator outputting a control signal for rewrite operation into said comparison-data storage section, only when said data-rewrite judgment section decides to allow the rewriting of the password data for comparison.

8. An IC memory card having an interface section for connecting the IC card to an external host system apparatus as an information processing apparatus and a memory section for storing data sent from the external host system apparatus through the interface section, the IC memory card comprising:

a password check circuit that compares a password input from the host system apparatus with a predetermined password to output a password comparison result; and a data encipherment circuit that enciphers the data input from the host system apparatus based on the password comparison result, said data encipherment circuit enciphering the data input from the host system apparatus through the interface section to store the enciphered data in the memory section, if the passwords coincide with each other, said data encipherment circuit storing the data input from the host system apparatus through the interface section in the memory section without encipherment, if the passwords do not coincide with each other, wherein the data that is enciphered by said data encipherment circuit when the passwords coincide with each other is the same data stored in the memory section by said data encipherment circuit when the passwords do not coincide with each other.

9. The IC memory card as defined in claim 8 further comprising:

a data decipherment circuit that deciphers the data read out from the memory section based on the password comparison result, said data decipherment circuit deciphering the data read out from the memory section to output deciphered data to the host system apparatus through the interface section, if the passwords coincide with each other, said data decipherment circuit outputting the data read out from the memory section, without decipherment, to the host system apparatus through the interface section, if the passwords do not coincide with each other, wherein the data that is deciphered by said data decipherment circuit when the passwords coincide with each other is the same data output from said data decipherment circuit when the passwords do not coincide with each other.

10. The IC memory card as defined in claim 8, wherein said password check circuit includes:

a check-data register section having a plurality of registers, each of which latches a data piece of the password input from the host system apparatus, a register controller that controls the latching operation of said check-data register section, a comparison-data setting section in which predetermined password data for comparison is set beforehand, and a data comparison section that compares the password data latched in said check-data register section with the password data for comparison set in said comparison-data setting section to output a comparison result as the password comparison result.

11. The IC memory card as defined in claim 10, wherein said register controller generates a control signal from address data and a card-mode control signal, which are input from the host system apparatus, and outputs the control signal to said check-data register section, which is controlled by said control signal.

12. The IC memory card as defined in claim 10, wherein said check-data register section forms an I/O space for access.

13. The IC memory card as defined in claim 8, wherein said password check circuit includes:

a check data register section having a plurality of registers, each of which latches a data piece of the password input from the host system apparatus, a comparison-data storage section having a rewritable ROM in which password data for comparison is stored, a comparison-data register section having a plurality of registers, each of which latches a data piece of a password for comparison stored in said comparison-data storage section, a control section that controls the operation of said comparison-data storage section as well as the latching operation of said check-data register section and said comparison-data register section, and a data comparison section that compares the password data latched in said check-data register section with the password data for comparison latched in said comparison-data register section to output the comparison result, which becomes the password comparison result.

14. The IC memory card as defined in claim 13, wherein said check-data register section, said comparison-data storage section, and said comparison-data register section form an I/O space for access and share with each other the addresses of the I/O space.

15. The IC memory card as defined in claim 13, wherein said control section includes:

a signal generator that generates control signals from address data and a card-mode control signal that are input from the host system apparatus, each of the control signals being output into each of said check-data register section, said comparison-data register section, and said comparison-data storage section, which are controlled thereby respectively, and a data-rewrite judgment section that decides whether to allow the rewriting of the password data for comparison by checking password data for data rewrite input from the host system apparatus, said signal generator outputting a control signal for rewrite operation to said comparison-data storage section, only when said data-rewrite judgment section decides to allow the rewriting of the password data for comparison.

* * * * *